(12) United States Patent
Manji

(10) Patent No.: US 10,974,597 B1
(45) Date of Patent: Apr. 13, 2021

(54) TRAVELING VEHICLE

(71) Applicant: Kubota Corporation, Osaka (JP)

(72) Inventor: Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/930,628

(22) Filed: May 13, 2020

(30) Foreign Application Priority Data

Oct. 30, 2019 (JP) .............................. JP2019-197140

(51) Int. Cl.
| | |
|---|---|
| *B62D 11/02* | (2006.01) |
| *B60K 26/02* | (2006.01) |
| *B60K 1/00* | (2006.01) |
| *B62D 1/12* | (2006.01) |
| *B60T 8/171* | (2006.01) |
| *A01D 101/00* | (2006.01) |
| *B60T 7/08* | (2006.01) |
| *A01D 34/64* | (2006.01) |
| *A01D 69/10* | (2006.01) |
| *A01D 69/02* | (2006.01) |

(52) U.S. Cl.
CPC .............. *B60K 26/02* (2013.01); *B60K 1/00* (2013.01); *B60T 8/171* (2013.01); *B62D 1/12* (2013.01); *A01D 34/64* (2013.01); *A01D 69/02* (2013.01); *A01D 69/10* (2013.01); *A01D 2101/00* (2013.01); *B60K 2001/001* (2013.01); *B60K 2026/025* (2013.01); *B60T 7/085* (2013.01); *B60T 2240/00* (2013.01)

(58) Field of Classification Search
CPC .... B60K 26/02; B60K 1/00; B60K 2026/025; B62D 1/12; B60T 7/08; B60T 7/085; B60T 7/10
See application file for complete search history.

(56) References Cited

U.S. PATENT DOCUMENTS

| | | | |
|---|---|---|---|
| 6,301,864 B1 * | 10/2001 | Damie | A01D 34/6812 56/11.3 |
| 6,434,917 B1 * | 8/2002 | Bartel | A01D 34/64 180/286 |
| 6,729,115 B2 * | 5/2004 | Bartel | A01D 34/69 180/286 |
| 7,686,108 B2 | 3/2010 | Piontek | |
| 8,240,420 B1 * | 8/2012 | Bartel | A01D 34/64 180/315 |
| 10,681,867 B2 * | 6/2020 | Dunbar | A01D 34/66 |
| 10,834,870 B2 * | 11/2020 | Wagner | B62D 11/183 |

* cited by examiner

*Primary Examiner* — Tony H Winner
(74) *Attorney, Agent, or Firm* — The Webb Law Firm

(57) ABSTRACT

A traveling vehicle includes a pair of left and right drive wheels, a drive unit for providing driving force to the drive wheels, a drive wheel operation unit having a forward speed position, a neutral position, a reverse speed position and a parking position, a position detector for detecting the parking position of the drive wheel operation unit, a parking brake configured to brake the drive wheels under an operative state thereof, a rotation detector for detecting a predetermined state from a stopped state to a predetermined rotational speed of the drive wheels and a control unit configured to render the parking brake into the operative state on a condition including detection of the parking position by the position detector and detection of the predetermined state by the rotation detector.

7 Claims, 5 Drawing Sheets

TRAVELING VEHICLE

CROSS-REFERENCE TO RELATED APPLICATION

This application claims priority to Japanese Patent Application No. 2019-197140 filed Oct. 30, 2019, the disclosure of which is hereby incorporated by reference in its entirety.

BACKGROUND OF THE INVENTION

Field of the Invention

A grass mowing machine according to U.S. Pat. No. 6,434,917 includes a pair of left and right maneuvering levers for adjusting driving speeds and driving directions of a pair of left and right drive wheels, an axial piston variable displacement pump and a hydraulic wheel motor which are operated based on operations of the maneuvering levers, and a parking brake. In response to movements of the maneuvering levers in the front/rear direction, a swash plate of the axial piston variable displacement pump is moved to/between a forward traveling position, a neutral position and a reverse traveling position. The maneuvering levers are laterally displaceable at their neutral positions. As this lateral displacement of the maneuvering lever is transmitted via a link mechanism to the parking blade, the parking brake is activated. In the case of a grass mowing machine according to U.S. Pat. No. 7,686,108, in order to determine a forward traveling speed and a reverse traveling speed, a pair of left and right maneuvering levers are movable in the front/rear direction. And, as the maneuvering levers are moved laterally at the neutral position in the front/rear direction, a brake switch is turned ON, whereby a parking brake is activated.

With the grass mowing machines disclosed in U.S. Pat. Nos. 6,434,917 and 7,686,108, by laterally moving the maneuvering lever from the neutral position, the parking brake is activated. However, even when the maneuvering lever has been moved from a traveling position to the neutral position, this does not necessarily bring the machine body to the stopped state immediately. If the parking brake is activated when the machine body is not at the stopped state, a stopping shock will occur to give discomfort to the driver. The object of the present invention is to provide a work vehicle having a parking brake control arrangement that does not give discomfort to the driver.

SUMMARY OF THE INVENTION

According to the present invention, there is provided a traveling vehicle comprising:
  a pair of left and right drive wheels;
  a drive unit for providing driving force to the drive wheels;
  a drive wheel operation unit having a forward speed position, a neutral position, a reverse speed position and a parking position;
  a position detector for detecting the parking position of the drive wheel operation unit;
  a parking brake configured to brake the drive wheels under an operative state thereof;
  a rotation detector for detecting a predetermined state from a stopped state to a predetermined rotational speed of the drive wheels; and
  a control unit configured to render the parking brake into the operative state on a condition including detection of the parking position by the position detector and detection of the predetermined state by the rotation detector.

With the above-described arrangement, in order to allow the parking brake to be rendered into the operative state, this requires not only detection of the parking position by the position detector, but also the condition of the drive wheels being under the stopped state or the rotational speeds of the drive wheels being under the predetermined rotational speed. Namely, even if the drive wheel operation unit is located at the parking position, if rotational speeds of the drive wheels exceed the predetermined rotational speed, the parking brake will not be rendered into the operative state. Thus, the present invention does not give the driver the shock due to sudden stop from a traveling state.

According to one preferred embodiment:
  the drive wheel operation unit is displaceable by a linear operation to/among the forward speed position, the neutral position and the reverse speed position and is displaceable to the parking position while maintaining the neutral position.

With the above-described arrangement, in a traveling situation in which forward traveling operations and reverse traveling operations are repeatedly carried out in alternation across the neutral position, the parking brake is not rendered into the operable state unless the drive wheel operation unit is displaced to the parking position. Thus, the forward traveling operations and the reverse traveling operations can be carried out in a smooth manner. Further, since the arrangement causes the driver to active the parking brake with awareness different from awareness exerted when switching the traveling speed or traveling direction, inadvertent operation of the parking brake can be suppressed.

According to a preferred embodiment of the present invention:
  if the rotation detector detects a rotational speed exceeding the predetermined rotational speed at the time of detection of the parking position by the position detector, the control unit provides a deceleration instruction or a stop instruction to the drive unit.

Even if the driver displaces the drive wheel operation unit to the parking position in order to activate the parking brake, if the rotational speed of the drive wheel exceeds the predetermined rotational speed, the parking brake will be prevented from being rendered into the operative state. Advantageously, in order to allow the parking brake to be activated in such situation as above, the drive unit will automatically effect a deceleration control or stop control to reduce the rotational speed of the drive wheel to a speed lower than the predetermined rotational speed.

According to a preferred embodiment of the present invention:
  the drive unit comprises a motor: and
  the control unit provides, as the stop instruction, a zero speed instruction to generate a torque in the motor.

In case the drive unit comprises a motor, for allowing smooth deceleration or stopping of the drive wheels, the stationary torque of the motor can be effectively utilized.

According to one preferred embodiment of the present invention:
  the drive wheel operation unit forcibly renders the parking brake into the operative state if the detection of the parking position by the position detector and the detection of a rotational speed exceeding the predetermined rotational speed by the rotation detector have continued for a predetermined period.

Even if the driver is trying to activate the parking brake, the parking brake will not be activated if the rotational speed of the drive wheel exceeds the predetermined rotational speed. Too long continuation of such situation is not desirable for driving operation.

According to a still further preferred embodiment of the present invention:

the drive wheel operation unit comprises a pair of left and right maneuvering levers operable independently to the forward speed position, the neutral position and the reverse speed position; and the control unit renders the parking brake into the operative state if the position detector detects the parking positions of both the left maneuvering lever and the right maneuvering lever and the rotation detector detects a rotational speed exceeding the predetermined rotational speed.

According to a still further preferred embodiment of the present invention:

the drive wheel operation unit comprises a pair of left and right maneuvering levers operable independently to the forward speed position, the neutral position and the reverse speed position; and the control unit renders the parking brake into the operative state if the position detector detects the parking position of either one of the left maneuvering lever and the right maneuvering lever and the rotation detector detects a rotational speed exceeding the predetermined rotational speed.

In the case of a traveling vehicle such as a zero-turn mower, the vehicle employs the drive wheel operation unit comprised of a pair of left and right maneuvering levers operable independently to the forward speed position, the neutral position and the reverse speed position. With such drive wheel operation unit, there will occur a first state in which only one of the left and right maneuvering levers is operated to the parking position and a second state in which both the left and right maneuvering levers are operated to the parking position. Therefore, it is possible to select the first state or the second state as the requisite condition for rendering the parking brake into the operative state.

DETAILED DESCRIPTION OF THE PREFERRED EMBODIMENTS

Figure 1:
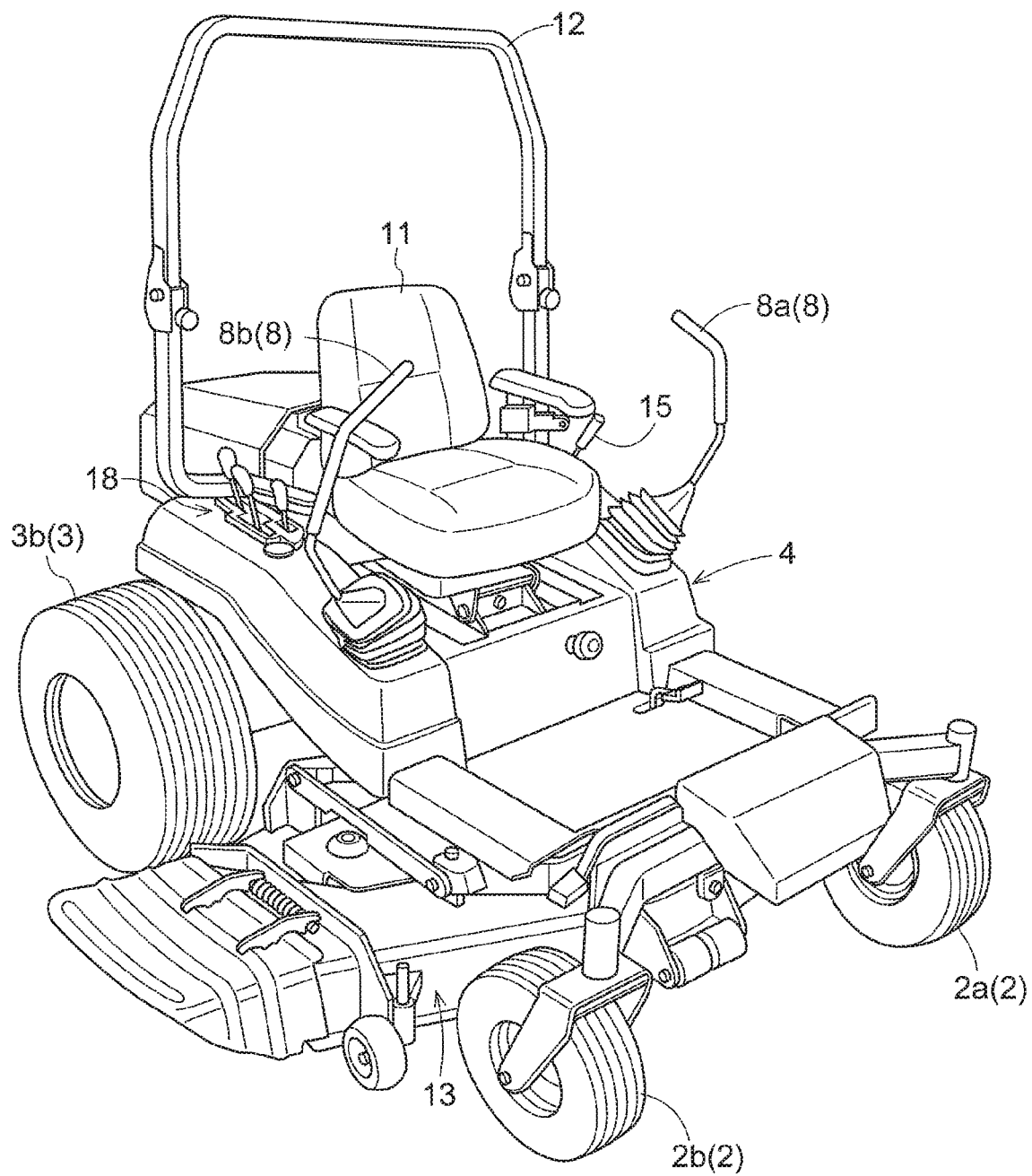
FIG. 1 is a perspective view showing a traveling vehicle.
Figure 2:
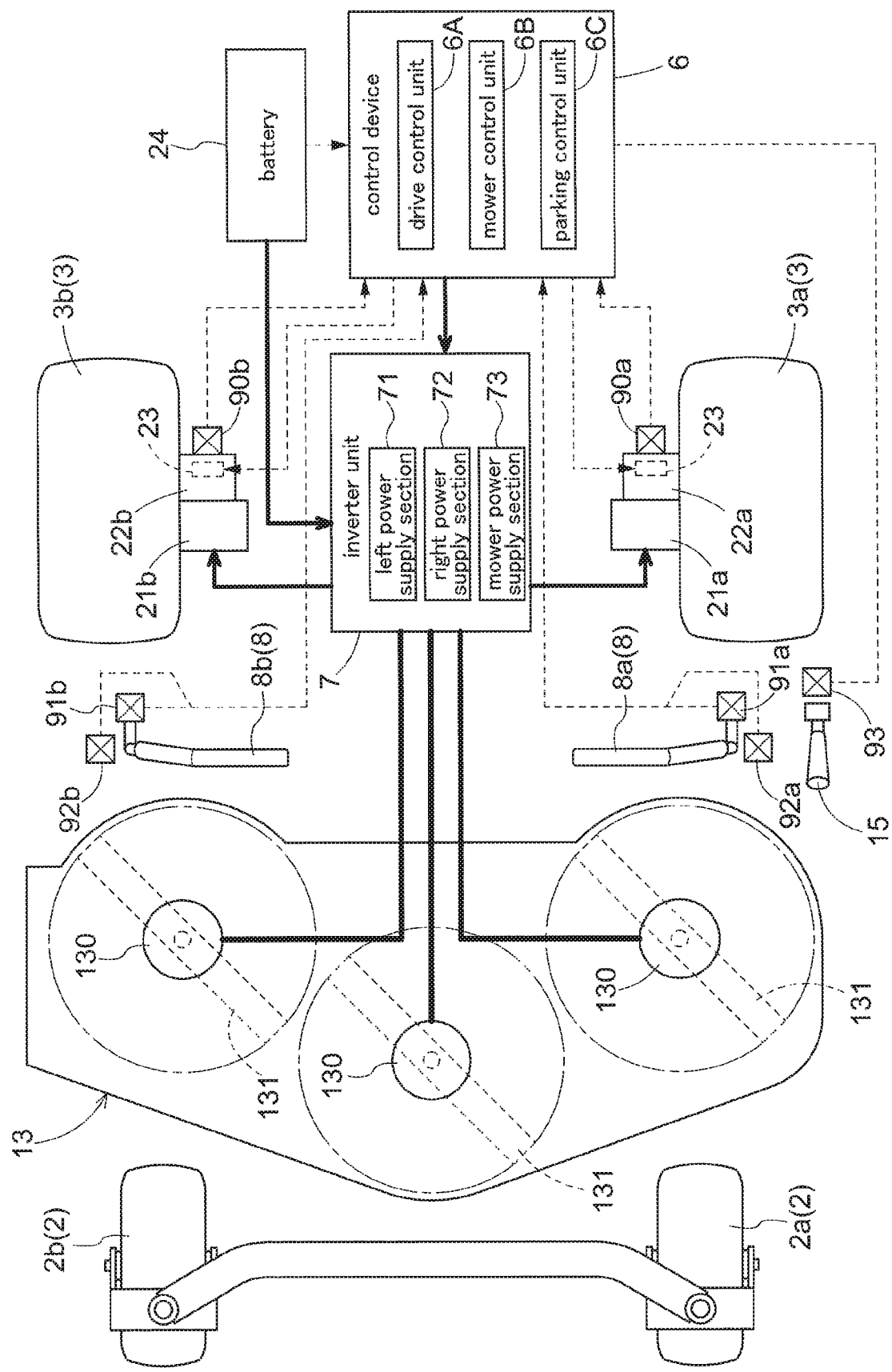
FIG. 2 is a system diagram showing an electric system and power system of the traveling vehicle.

A riding electric grass mowing machine (to be referred to simply as "grass mowing machine" hereafter) disclosed in this embodiment is an example of a "traveling vehicle". Incidentally, the traveling vehicle is not limited to such grass mowing machine. FIG. 1 is a perspective view showing the grass mowing machine. FIG. 2 is a system diagram showing an electric system and a power system of the grass mowing machine. Incidentally, in this detailed disclosure, unless explicitly indicated otherwise, the term "front" means the front or forward side in the vehicle body front/rear direction (traveling direction) and the term "rear" means the rear or reverse side in the vehicle body front/rear direction (traveling direction). Further, the left/right direction or the lateral (transverse) direction refers to the vehicle body transverse direction (vehicle body width direction) orthogonal to the vehicle body front/rear direction. Also, the term "upper" or "lower" refers to the positional relationship in the respect of the perpendicular (vertical) direction of the vehicle body, indicating a ground clearance (height).

As shown in FIG. 1 and FIG. 2, the grass mowing machine includes a vehicle body 4 and this vehicle body 4 is supported via front wheels 2 and rear wheels 3. The front wheels 2 are caster wheels including a left front wheel 2a and a right front wheel 2b. The rear wheels 3 are drive wheels including a left rear wheel 3a and a right rear wheel 3b. At a rear portion of the vehicle body 4, a battery 24 is disposed. Forwardly of the battery 24, a driver's seat 11 is disposed. Rearwardly of the driver's seat 11, a ROPS frame 12 is disposed. In the space between the front wheels 2 and the rear wheels 3 and under the vehicle body 4, a mower unit 13 is suspended from the vehicle body 4 via a lift link mechanism to be liftable up/down.

Forwardly of the driver's seat 11, a there is provided a floor plate serving as a footrest for the driver. On both sides of the driver's seat 11, there are disposed a left maneuvering lever 8a and a right maneuvering lever 8b. The left maneuvering lever 8a and the right maneuvering lever 8b are an example of a "drive wheel operation unit 8". On the right side of the driver's seat 11, an electric operational panel 18 is provided and this electric operational panel 18 includes switching buttons, switching levers, etc. of the electric system. On the left side of the driver's seat 11, there is provided a mower operational tool 15. The driver will operate this mower operational tool 15 to effect ON/OFF operations of the mower unit 13.

As shown in FIG. 2, the left rear wheel 3a and the right rear wheel 3b as "drive wheels" receive driving power from a pair of left and right drive units and these left and right drive units are controlled in their driving independently of each other. The left drive unit includes a left motor 21a and a left speed reduction device 22a. The right drive unit includes a right motor 21b and a right speed reduction device 22b. The left speed reduction device 22a and the right speed reduction device 22b each incorporates a parking brake 23. With activations of the parking brake 23, a power transmission shaft extending from the left motor 21a to the left rear wheel 3a and a power transmission shaft extending from the right motor 21b to the right rear wheel 3b are braked, as a result, the left rear wheel 3a and the right rear wheel 3b are braked.

A control device 6 includes a drive control unit 6A, a mower control unit 6B, a parking control unit (control unit) 6C. Based on a left rear wheel control signal from the drive control unit 6A, the left motor 21a receives power supply from a left power supply section 71 and the left motor 21a is rotatably driven. Based on a right rear wheel control signal from the drive control unit 6A, the right motor 21b receives power supply from a right power supply section 72 and the right motor 21b is rotatably driven. The left power supply section 71 and the right power supply section 72 are constituted of inverters, which are incorporated in an inverter unit 7.

The mower unit 13 includes three rotary blades 131. The rotary blades 131 rely on mower motors 130 as their driving sources. Based on a control signal from the mower control unit 6B, the mower motors 130 receive power supply from the mower power supply section 73, whereby the mower motors 130 are rotatably driven. The mower power supply section 73 too is constituted of an inverter, which is incorporated in the inverter unit 7.

With this grass mowing machine, based on a difference between rotational speeds of the left rear wheel 3a and the right rear wheel 3b, a direction change (a turn) of the vehicle body 4 is effected. Speed changes of the left motor 21a and the right motor 21b are effected based on pivotal operations of the left maneuvering lever 8a and the right maneuvering lever 8b respectively. In a linear (straight) operational path of the left maneuvering lever 8a in the front/rear direction, there are set a forward speed position, a neutral position and reverse speed position. In a linear (straight) operational path of the right maneuvering lever 8b in the front/rear direction, there are set a forward speed position, a neutral position and reverse speed position. Namely, when a user operates the left maneuvering lever 8a and the right maneuvering lever 8b, a straight traveling state, a gentle turning state, a pivot turning state and a spin turning state will be realized respectively. For instance, the straight traveling state is realized by forwardly driving the left rear wheel 3a and the right rear wheel 3b at an equal speed or reversely driving the left rear wheel 3a and the right rear wheel 3b at an equal speed. The gentle turning state is realized by forwardly driving the left rear wheel 3a and the right rear wheel 3b at different speeds or reversely driving the left rear wheel 3a and the right rear wheel 3b at different speeds. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other reversely.

Figure 3:
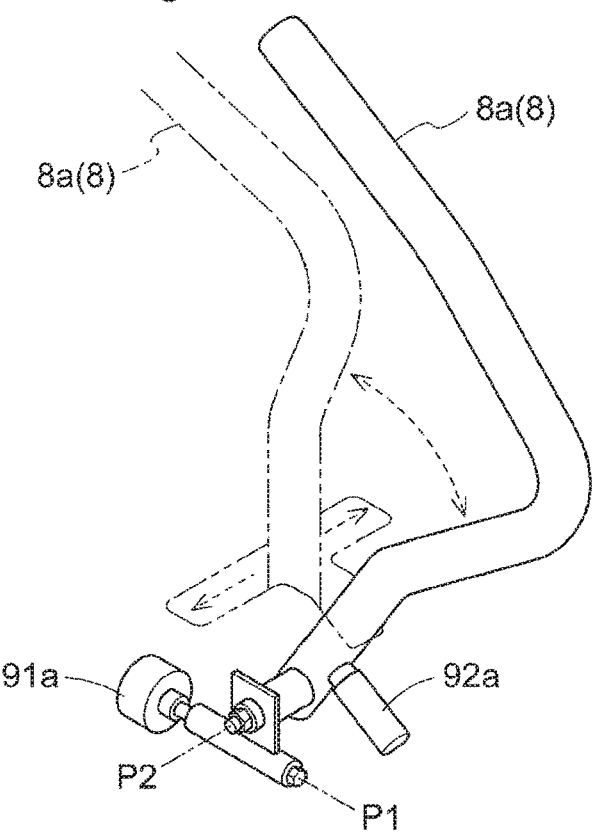
FIG. 3 is a perspective view showing a maneuvering lever at a forward traveling position.
Figure 4:
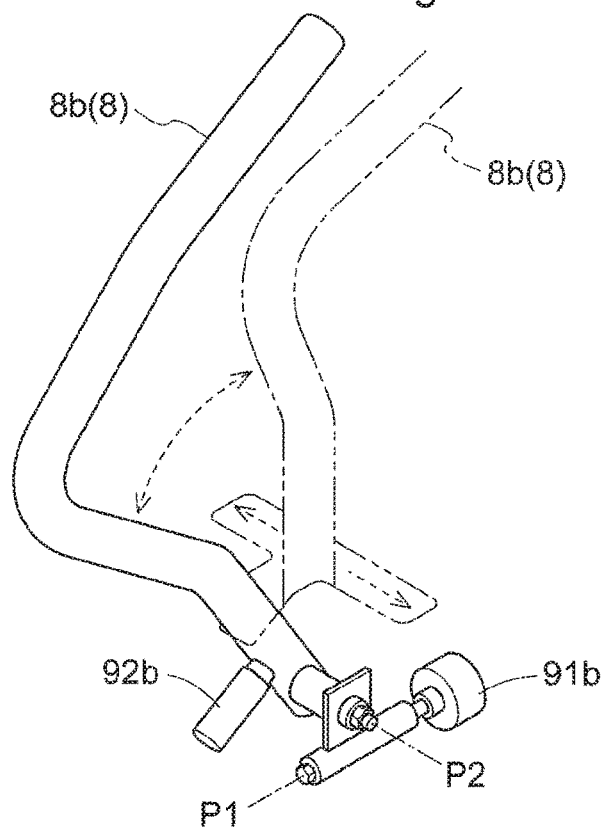
FIG. 4 is a perspective view showing the maneuvering lever at a parking position.

As shown in FIG. 3 and FIG. 4, the left maneuvering lever 8a and the right maneuvering lever 8b are capable of displacements in the front/rear direction, namely, pivotal displacements about a first axis P1. The former half portion of this front/rear direction displacement is used for adjustment of vehicle body forward traveling speed and the latter half portion of this front/rear direction displacement is used for adjustment of vehicle body reverse traveling speed, and its intermediate position is the neutral position in the speed change. Further, the left maneuvering lever 8a and the right maneuvering lever 8b are capable, at their intermediate positions, of displacements in the lateral direction, namely, pivotal displacements about a second axis P2. The terminal position of this lateral displacement becomes the parking position. When the parking brake 23 is activated by an operation of the drive wheel operation unit 8, reliable stopped state of the vehicle body 4 is created.

A displacement amount (a pivot angle) in the front/rear direction of the left maneuvering lever 8a is detected by a left steering angle detection sensor 91a. A displacement amount (a pivot angle) in the front/rear direction of the right maneuvering lever 8b is detected by a right steering angle detection sensor 91b. Further, the terminal position of the lateral displacement of the left maneuvering lever 8a is detected by a left parking switch 92a. And, the terminal position of the lateral displacement of the right maneuvering lever 8b is detected by a right parking switch 92b. Thus, the left parking switch 92a and the right parking switch 92b function respectively as a "position detector" for detecting a parking position of the drive wheel operation unit 8 (the left maneuvering lever 8a and the right maneuvering lever 8b). An operation of the mower operational tool 15 is detected by a mower sensor 93. Further, a rotational speed of the left rear wheel 3a, namely, a rotational speed of the left motor 21a, is detected by a left rotation detection sensor 90a, and a rotational speed of the right rear wheel 3b, namely, a rotational speed of the right motor 21b, is detected by a right rotation detection sensor 90b. Thus, the left rotation detection sensor 90a functions as a "rotation detector" for detecting a rotational speed of the left motor 21a and a rotational speed of the left rear wheel 3a. Further, the right rotation detection sensor 90b functions as a "rotation detector" for detecting a rotational speed of the right motor 21b and a rotational speed of the right rear wheel 3b. Needless to say, respective dedicated rotation detectors may be provided.

The control device 6 is constituted of a CPU as the core component thereof and includes the drive control unit 6A, the mower control unit 6B, and the parking control unit 6C. Rear wheel control signals are generated based on operational amounts of the left maneuvering lever 8a and the right maneuvering lever 8b, respectively. The drive control unit 6A provides rear wheel control signals to the left power supply section 71 and the right power supply section 72, thus controlling driving of the left motor 21a and the right motor 21b. The mower control unit 6B generates a control signal based on a detection signal from the mower sensor 93 and provides this control signal to the mower power supply section 73, thus controlling driving of the rotary blades 131.

Figure 5:
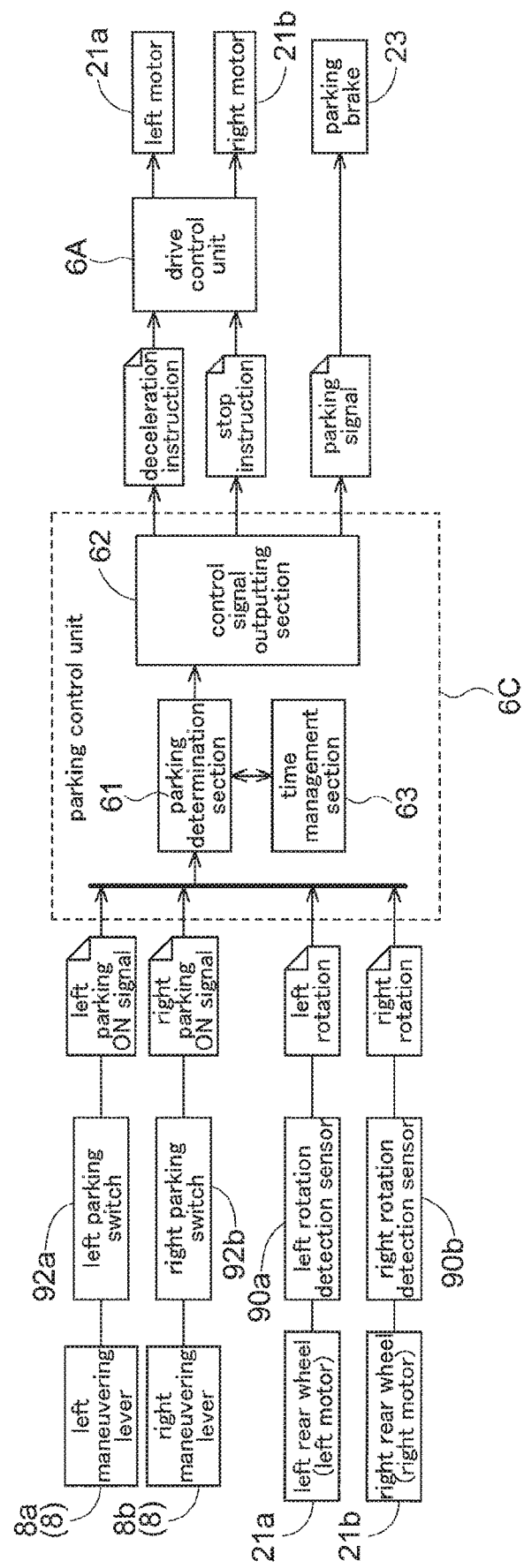
FIG. 5 is a functional block diagram showing functions of a control unit.

FIG. 5 shows a functional block diagram of the parking control unit 6C. This parking control unit 6C inputs a left parking ON signal, a right parking ON signal, a left rotation signal and a right rotation signal. The left parking ON signal is outputted from the left parking switch 92a in response to an operation of the left maneuvering lever 8a to the parking position. The right parking ON signal is outputted from the right parking switch 92b in response to an operation of the right maneuvering lever 8b to the parking position. The left rotation signal is a signal outputted from the left rotation detection sensor 90a and represents a rotational speed of the left rear wheel 3a or the left motor 21a. The right rotation signal is a signal outputted from the right rotation detection sensor 90b and represents a rotational speed of the right rear wheel 3b or the right motor 21b.

From the parking control unit 6C, a deceleration instruction, a stop instruction and a parking signal are outputted. The deceleration instruction and/or the stop instruction are (is) provided to the drive control unit 6A, whereby one or both of the left motor 21a and the right motor 21b will be stopped or decelerated. In response to the parking signal, the parking brake 23 is activated, whereby the left rear wheel 3a and the right rear wheel 3b are braked.

The parking control unit 6C includes a parking determination section 61, a control signal outputting section 62 and a time management section 63. When the parking ON signal is inputted, if either the left rotation signal or the right rotation signal indicates a rotational speed between the zero rotation (stopped state of the rear wheels 3) and a predetermined rotational speed, the parking determination section 61 determines that a predetermined state is being detected and provides a parking request to the control signal outputting section 62. Then, the control signal outputting section 62, in response to this parking request, provides a parking signal to the parking brake 23 and will render the parking brake 23 into an operative state. In this embodiment, the input of the parking ON signal means at least one input of the left parking ON signal and the right parking ON signal. In a further embodiment, the input of the parking ON signal may mean inputs of both the left parking ON signal and the right parking ON signal. Further, regarding the condition of the predetermined state, the predetermined state can be a case where both the left rotation signal and the right rotation signal indicate rotational speeds between the zero rotation and the predetermined rotational speed while the parking ON signal is input.

Namely, even when the parking ON signal is being inputted, if either one of the left rotation signal and the right rotation signal indicates a rotational speed exceeding the above-described predetermined rotational speed, the parking determination section 61 will determine that the predetermined state is not detected, thus not providing any parking request to the control signal outputting section 62.

Moreover, even when the parking ON signal is being inputted, if either one of the left rotation signal and the right rotation signal indicates a rotational speed exceeding the predetermined rotational speed, the parking determination section 61 will provide a rotation suppressing request to the control signal outputting section 62 in order to realize the predetermined state. Then, in response to such rotation suppressing request, the control signal outputting section 62 will provide a deceleration instruction or a stop instruction to the drive control unit 6A. Such stop instruction to the motor is a zero speed instruction, which causes the motor to stop and causes also the motor to generate a torque to maintain its stopped state. In order to cause a rotating motor to stop, this involves deceleration. Thus, here, the deceleration instruction may be inclusive of a stop instruction.

Under the state of the parking ON signal being inputted, the time management section 63 determines whether a period lapsed with no detection of the predetermined state exceeds a predetermined period (a threshold value). If this predetermined period is exceeded, the time management section 63 will request to the parking determination section 61 that a parking instruction will be forcibly provided to the control signal outputting section 62. In response to this request, the parking determination section 61 will provide a forcible parking request to the control signal outputting section 62. Then, in response to this forcible parking request, the control signal outputting section 62 will output a forcible parking signal to the parking brake 23 and will render the parking brake 23 into the operative state.

Figure 6:
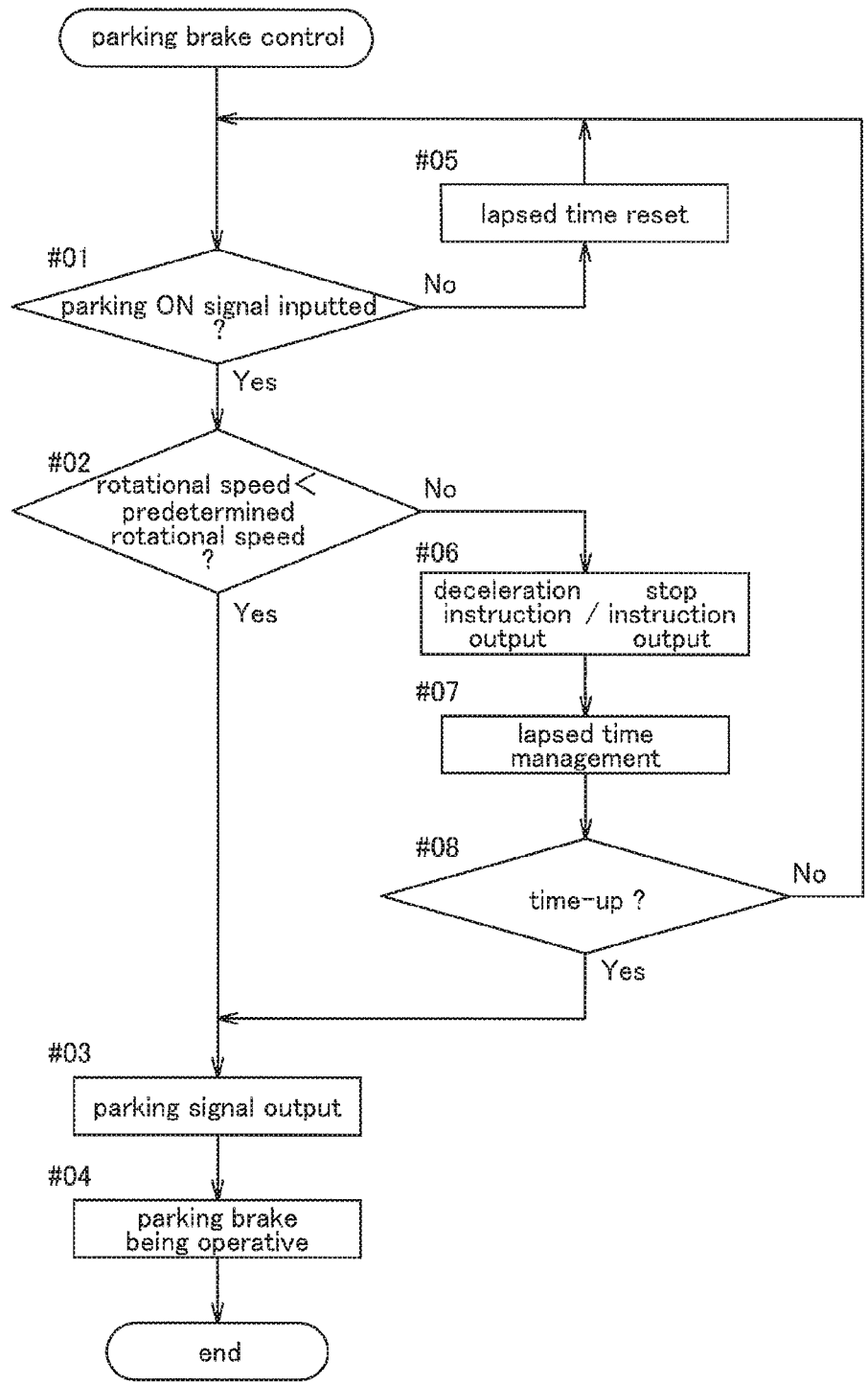
FIG. 6 is a flowchart of parking brake control.

One example of a parking control routine executed by the parking control unit 6C configured as described above is shown in the flowchart of FIG. 6. In this parking control routine, firstly, the process checks whether a parking ON signal is inputted or not (step #01). If the parking ON signal is inputted (YES branching at step #01), the process proceeds to check whether either one of the left rotation signal and the right rotation signal indicates a rotational speed between the zero rotation and the predetermined rotational speed or not, namely, whether the predetermined state is being detected or not (step #02). If the predetermined state is detected (YES branching at step #02) then, a parking signal is outputted to the drive control unit 6A (step #03). Then, the parking control unit 6C will render the parking brake 23 into the operative state (step #04). By checking at step #01, if it is determined that no parking ON signal is inputted (NO branching at step #01), then, the process will return to step #01. In this, however, the time management section 63 is currently executing the lapsed time processing, this processing will be reset (step #05).

By checking at step #02, if it is determined that the predetermined state is not detected (NO branching at step #02), then, a deceleration instruction or a stop instruction will be outputted to stop the rear wheels 3 (step #06). Further, the lapsed time processing by the time management section 63 is effected (step #07). The initial lapsed time processing in the activated parking brake control routine is a timer start. In the lapsed time management subsequent thereto (step #07), the process makes comparison between a lapsed period measured by a timer and a set threshold value. In this comparison, if the lapsed period exceeds the threshold value (time-up) (YES branching ate step #08), the process will branch to step #03 to output a parking signal, so that the parking brake 23 will be rendered into the operative state (step #04). If the lapsed period falls below the threshold value (NO branching at step #08), the process will branch to step #01 to repeat the above-described steps.

OTHER EMBODIMENTS

In the foregoing embodiment, explanation was made with citing a grass mowing machine as an example of the "traveling vehicle". The traveling vehicle may be a multiple-purpose vehicle, a snow plowing vehicle, an agricultural work vehicle, etc., to which the present invention is applicable also.

In the foregoing embodiment, variable speed electric motors were employed as the driving sections. In place of this, it is also possible to employ a pair of left and right HST's that are of the hydraulic type and that allow stepless speed changes. With such HST's, the inverter control will be replaced by hydraulic control. And, adjustments of swash plates as speed change operations will be effected based on control signals from the drive control unit 6A and the parking brake control will be effected by the parking control unit 6C.

In the foregoing embodiment, the drive wheel operation unit 8 was constituted of the pivotal type left maneuvering lever 8a and right maneuvering lever 8b. Instead, the unit may be constituted of a steering wheel. In that case, the parking position will be detected by an operation of switch or the like provided on the steering wheel or in its surrounding.

The present invention is applicable to a traveling vehicle configured such that a parking brake is operated by an operation of a drive wheel operation unit.

Incidentally, the arrangements disclosed in the above-described embodiment (including the further embodiments, applicable to the following also) may be used in any combination with arrangements disclosed in the other embodiment, unless contradiction results from such combination, Further, the embodiments disclosed in this detailed disclosure are only exemplary, and the present invention is not limited thereto, but various changes and modifications thereof will be possible within a range not departing from the essence of the present invention.

The invention claimed is:

1. A traveling vehicle comprising:
  a pair of left and right drive wheels;
  a drive unit for providing driving force to the drive wheels;
  a drive wheel operation unit having a forward speed position, a neutral position, a reverse speed position and a parking position;
  a position detector for detecting the parking position of the drive wheel operation unit;
  a parking brake configured to brake the drive wheels under an operative state thereof;
  a rotation detector for detecting a predetermined state from a stopped state to a predetermined rotational speed of the drive wheels; and
  a control unit configured to render the parking brake into the operative state on a condition including detection of the parking position by the position detector and detection of the predetermined state by the rotation detector.

2. The traveling vehicle of claim 1, wherein the drive wheel operation unit is displaceable by a linear operation to/among the forward speed position, the neutral position and the reverse speed position and is displaceable to the parking position while maintaining the neutral position.

3. The traveling vehicle of claim 1, wherein if the rotation detector detects a rotational speed exceeding the predetermined rotational speed at the time of detection of the parking position by the position detector, the control unit provides a deceleration instruction or a stop instruction to the drive unit.

4. The traveling vehicle of claim 3, wherein:
the drive unit comprises a motor: and
the control unit provides, as the stop instruction, a zero speed instruction to generate a torque in the motor.

5. The traveling vehicle of claim 1, wherein the drive wheel operation unit forcibly renders the parking brake into the operative state if the detection of the parking position by the position detector and the detection of a rotational speed exceeding the predetermined rotational speed by the rotation detector have continued for a predetermined period.

6. The traveling vehicle of claim 1, wherein:
the drive wheel operation unit comprises a pair of left and right maneuvering levers operable independently to the forward speed position, the neutral position, the reverse speed position and the parking position; and
the control unit renders the parking brake into the operative state if the position detector detects the parking positions of both the left maneuvering lever and the right maneuvering lever and the rotation detector detects a rotational speed exceeding the predetermined rotational speed.

7. The traveling vehicle of claim 1, wherein:
the drive wheel operation unit comprises a pair of left and right maneuvering levers operable independently to the forward speed position, the neutral position, the reverse speed position and the parking position; and
the control unit renders the parking brake into the operative state if the position detector detects the parking position of either one of the left maneuvering lever and the right maneuvering lever and the rotation detector detects a rotational speed exceeding the predetermined rotational speed.

\* \* \* \* \*